Feb. 26, 1929.

D. B. SAMUELSON

FOOD SCALE

Filed Feb. 2, 1928

INVENTOR:
David B. Samuelson
By David E. Carlsen
ATTORNEY:

Feb. 26, 1929.   D. B. SAMUELSON   1,703,639
FOOD SCALE
Filed Feb. 2, 1928   2 Sheets-Sheet 2

INVENTOR:
David B. Samuelson
By David E. Carlsen
ATTORNEY.

Patented Feb. 26, 1929.

1,703,639

UNITED STATES PATENT OFFICE.

DAVID B. SAMUELSON, OF ST. PAUL, MINNESOTA.

FOOD SCALE.

Application filed February 2, 1928. Serial No. 251,354.

My invention relates to weighing devices in general and more particularly to a food scale of novel construction and particularly adapted for weighing and indicating quantities of food to be consumed by individuals, said weighing taking place on the table and right before the person about to partake of a meal.

Figure 1:
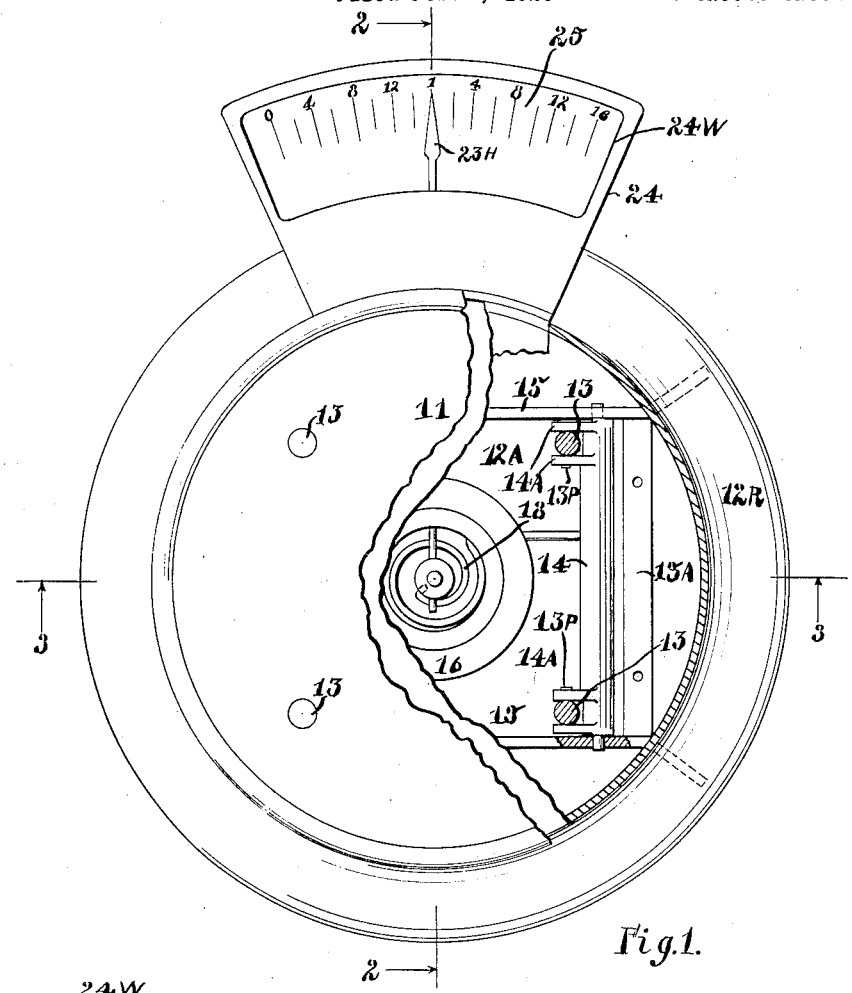
Fig. 1 is a top or plan view of my device, its right hand side being partly in section to expose certain mechanisms.

Referring to the drawing by reference numerals, 10 represents an ordinary table plate, soup bowl or other food container of circular form and having the usual circular rest ring $10^F$, said plate resting concentric within an upwardly directed circular flange $11^F$ of a scale platform 11 which will hereinafter for convenience be called the tray. Said tray is normally spring pressed upwardly in concentric and spaced relation above a circular downwardly flared and hollow base comprising an upper plate $12^A$, a base plate $12^B$ and the connecting perimetral rim $12^R$ of part $12^A$.

13 are four vertical posts fixed to the under side of tray 11 and projecting downwardly through apertures in plate $12^A$ and said posts arranged in square formation concentric of the tray. The posts are reciprocable vertically and their lower ends pivoted at $13^P$ between bifurcated arms $14^A$ directed inwardly, said arms provided one pair on each of two parallel rock shafts 14 the ends of which are mounted pivotally as $14^P$ in two fixed frame bars 15 within the base, said frame comprising further two more bars $15^A$, all said frame bars fixed in square formation. $14^B$ is an intermediate single arm on each shaft 14, each in spaced relation to the center thereof, one forward and one rearward, said arms $14^B$ projecting normally inwardly and downward obliquely (see Fig. 3).

Figure 2:
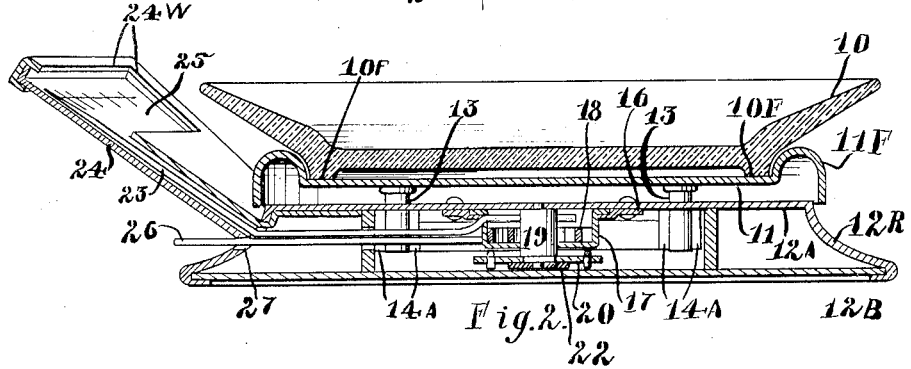
Fig. 2 is a longitudinal diametrical section as on line 2—2 in Fig. 1
Figures 3, 4, 5:
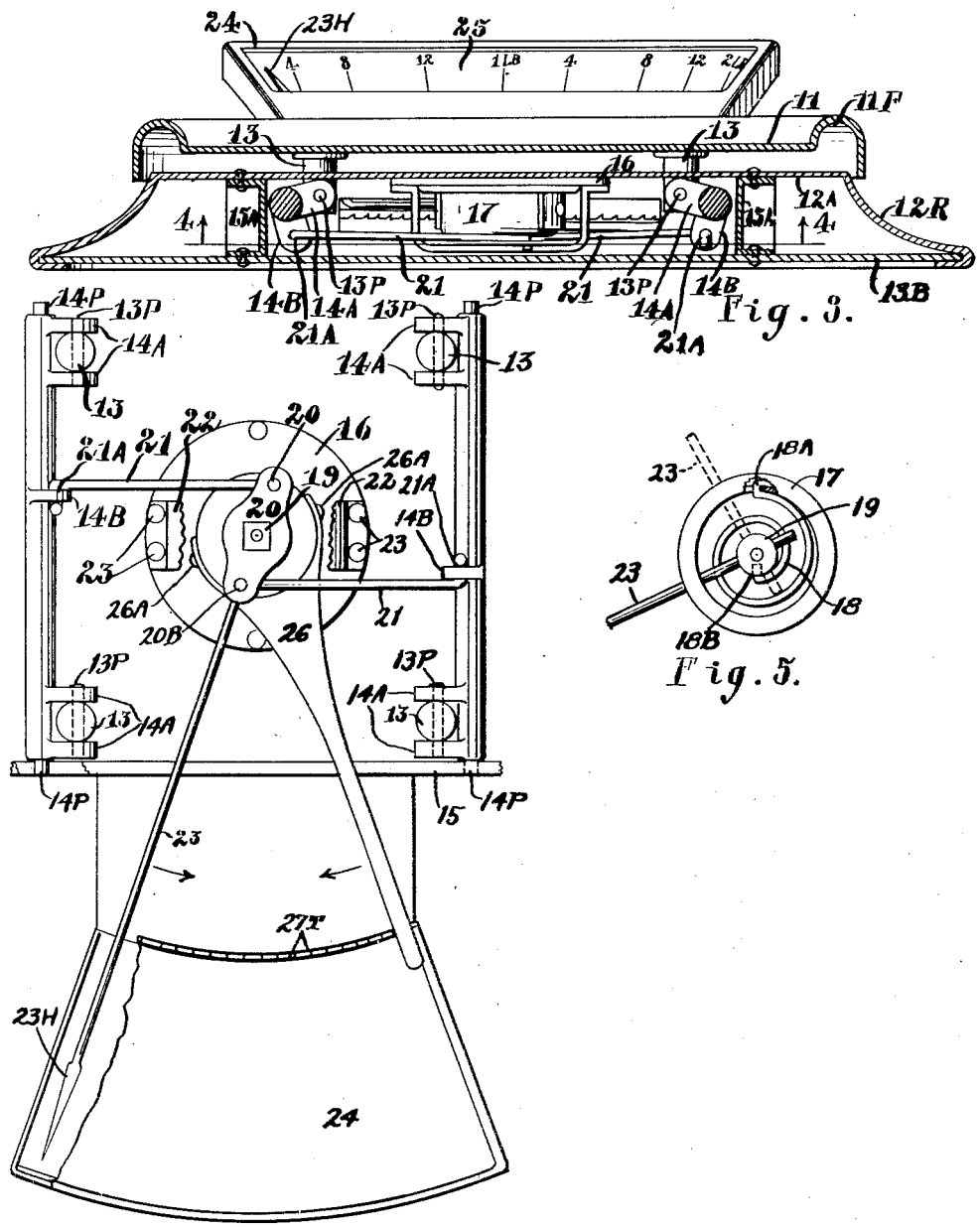
Fig. 3 is a diametrical cross section as on line 3—3 of Fig. 1.
Fig. 4 is a bottom view of the weight indicating means as on line 4—4 in Fig. 3.
Fig. 5 is a detail top view of the coil spring housing showing the fixed part of the indicator hand of my device.

In Fig. 2 is best shown a circular flanged track 16 fixed centrally and to the under side of the plate $12^A$ for oscillatably retaining the upper flanged part of a circular spring housing 17 enclosing a suitable flat coil spring 18 of clock type, one end of said spring fixed at $18^A$ to the side wall of the housing and the other end fixed as at $18^B$ in a vertical shaft 19 the upper end of which is journaled in the center plate $12^A$. Said shaft projects through the bottom of said housing and said projecting part carries a beam lever 20 each end of which pivotally retains at $20^B$ one end of a reach rod 21 and the other end of each said rod engages pivotally at $21^A$ in a rocker arm $14^B$. (See Figs. 2, 3 and 4.) Below lever 20 the rock shaft 19 is journaled in a U-shaped yoke 22 fixed as at $22^A$ to under side of flange member 16 (best shown in Figs. 2 and 4). 23 is a horizontal stem of an indicator hand $23^H$, said stem fixed diametrically in shaft 19 and above spring 18, extending thence radially into a hollow housing 24 formed in an arc concentric of the base and extending upwardly at an angle and integrally from rim $12^R$. Said housing has an upper window $24^W$ outwardly of the main base and below which the hand $23^H$ oscillates over a graduated scale 25 visible outwardly of any plate 10 on the tray 11. The scale 25, the spring 18, housing 17 and hand 23—$23^H$ are so proportioned and designed that without a weight on the tray the indicator hand $23^H$ points to 0 on the scale. It is obvious that when a plate is placed on the tray its weight will cause the hand to move correspondingly and then it is necessary to adjust the hand back to 0 before any victuals are placed on the plate. The said adjustment of the hand is accomplished by an adjustment lever 26 fixed as at $26^A$ to the outside of the spring housing 17 and the lever proper projects radially therefrom through a slit 27 in the flared part $12^R$ of the base and under that part of housing 24 which is joined to part $12^R$ (see Fig. 2). Said slitted part 27 comprises a row of upper notches or teeth $27^T$ in arched alinement and said teeth engaged one at a time by the lever 26. In Fig. 4 hand $23^H$ is shown in non-weight-indicating position, before a plate is placed on the tray, and lever 26 is at this time in the notch furthest from said hand $23^H$. It will be readily understood that when a plate 10 is placed on the tray 11, hand $23^H$ will move to a position corresponding to the weight of the plate, say 12 ounces. Now to move hand $23^H$ back to 0 before any victuals are placed on the plate, arm 26 is sprung toward hand $23^H$ slightly, increasing tension in spring 18 until shaft 18 causes said hand 23^H to swing back to zero and handle 26 is engaged in the required notch 27^T. Then when victuals are placed on the plate their weight is indicated by the hand 23^H.

The scale mechanism shown is not new in itself, namely the posts 13 moving downwardly when there is weight on the tray, thus oscillating arms 14^A and 14^B simultaneously the latter in turn reciprocating the rods 21 which oscillate lever 20, shaft 19 and the hand 23—23^H. The free end of adjustment lever 26 is always accessible and must of course be moved back to its original position so that hand 23^H points to 0 when there is no weight on the tray.

In the use of my device any individual can readily regulate his meals to certain quantities at all meals as may be though best according to his physical condition. If a certain amount of food is consumed daily and the individual's condition as to weight and health is maintained the said fixed amount should be consumed daily. After a certain period it is obvious that if there is an increase or decrease in weight of the individual, smaller or larger amounts of foods should be consumed for a certain period and eventually a quite accurate standard amount will be determined.

I claim—

1. In a food weighing device of the class described, a shallow circular base, an arcuate scale housing formed integral with said base at its outer edge, a scale thereon readable from above, a spring housing mounted centrally in said base, a vertical shaft in said housing, a coil spring within the housing with its outer end fixed thereto and its inner end fixed to said shaft, a hand fulcrumed in said shaft and extending normally over said scale and to non-weight indicating position thereon, a pair of parallel rock shafts mounted in said base each with two sets of inwardly directed lever arms, a tray supported concentric above said tray by said arms, a downwardly directed lever on each rock shaft, a beam lever fixed on said spring shaft, a reach rod from each said downward arm and connected to one end of said beam lever, posts on said tray directed downwardly and each pivotally connected to a set of lever arms, said tray adapted to yield downwardly under a primary weight placed thereon to rock said rock shafts and pull said reach rods and oscillate the housing and indicator hand, means for moving said hand back to non-weight indicating position and said hand moving means further operable to indicate further weight placed on the tray.

2. The structure specified in claim 1 in which said means for moving the hand back to non-weight indicating position after a primary weight has been placed on the tray, comprising a bifurcated lever extending radially from the spring housing and with its bifurcated part fixed to said housing, an arcuate toothed rack provided in said base near its outer rim and said bifurcated arm adapted to oscillate the spring housing against the spring pressure therein to spring the weight indicating hand back to non-weight indicating position and said bifurcated arm adapted to removably engage any of the notches in the toothed rack.

3. The structure specified in claim 1 in which said tray is formed with an upwardly directed perimetral flange for the purpose described.

In testimony whereof I affix my signature.

DAVID B. SAMUELSON.